April 2, 1963 P. M. STIGLIC 3,083,695
CONTROL ACTUATOR MECHANISM
Filed July 30, 1958 2 Sheets-Sheet 1

INVENTOR.
PAUL M. STIGLIC
BY
ATTORNEYS

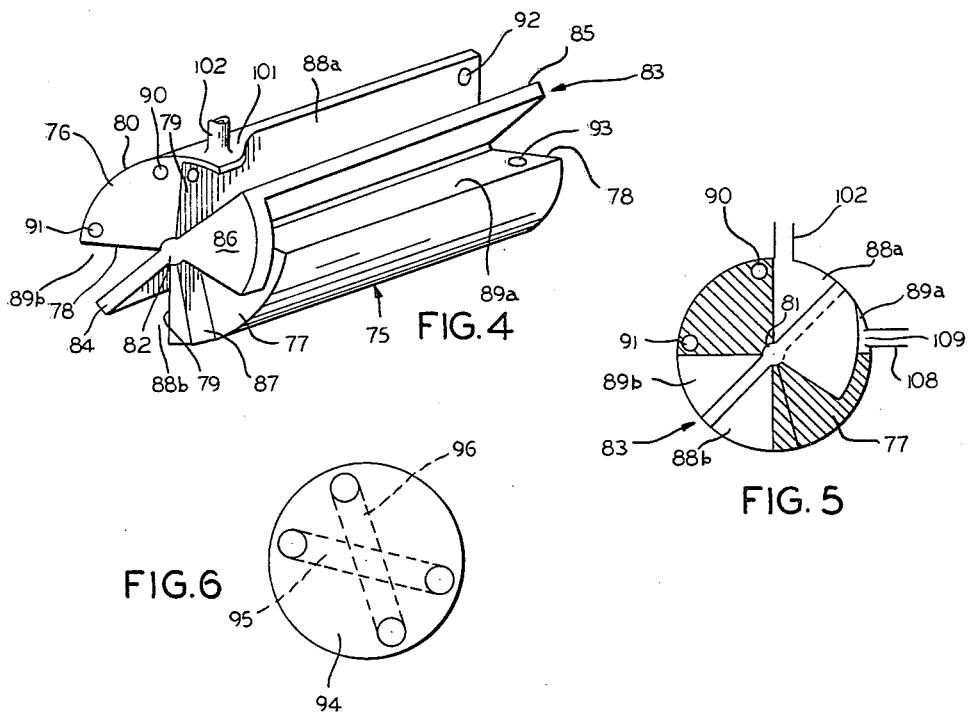
FIG. 4
FIG. 5
FIG. 6
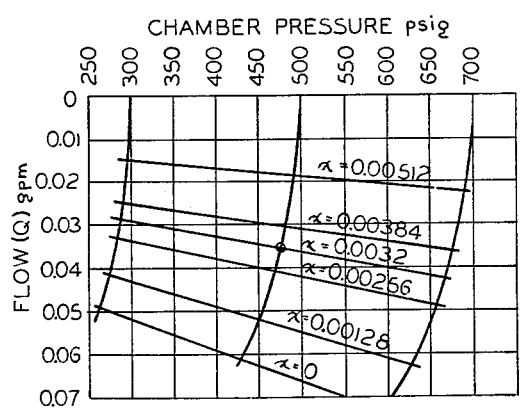
FIG. 7
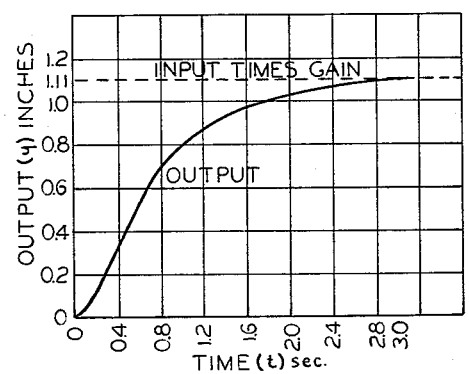
FIG. 8
*INVENTOR.*
PAUL M. STIGLIC

United States Patent Office

3,083,695
Patented Apr. 2, 1963

3,083,695
CONTROL ACTUATOR MECHANISM
Paul M. Stiglic, Wickliffe, Ohio, assignor to Thompson Ramo Wooldridge Inc., a corporation of Ohio
Filed July 30, 1958, Ser. No. 752,131
6 Claims. (Cl. 121—41)

The present invention relates broadly to improvements in control apparatus for gas turbine reaction engines, and is more particularly concerned with a control component effective to convert relatively small displacement signals at low power levels into substantially larger displacement or rotary output signals at high power levels.

Briefly stated, a device constructed in accordance with the principles of this invention comprises a chambered structure provided with variable effective flow area input and feedback nozzles and housing a movable shaped surface positioned for movement into proximity with the feedback nozzle, and operable upon a change in input nozzle flow area to rotate or translate to produce an output signal and vary the feedback nozzle flow area until the respective flow areas of the input and feedback nozzles are essentially equal whereupon rotation or translation will stop. As will be described in detail hereinafter, the movable surface may be a cam connecting with an impeller in association with a rotary type control actuator mechanism, or a ramp associated with a piston in a linear or translatory type mechanism. Other novel structural and operational features of the invention will become apparent as the description proceeds.

It is therefore an important aim of the present invention to provide a novel component especially useful in control system and other applications by means of which relatively small displacement signals at low power levels may be readily converted with extreme accuracy to larger linear or rotary output signals at higher power levels whereby useful work is performed.

Another object of the invention lies in the provision of a control actuator mechanism characterized by the absence therefrom of relatively complex linkages and the avoidance of the disadvantages and objections associated therewith of length changes with variations in temperature, relatively low wear properties, and generally high friction characteristics inducing poor performance of the control or other system with which the linkages are employed.

Another object of this invention is to provide a control device responsive to either temperature, speed or pressure outputs, and which operates with extreme reliability and accuracy even when located a substantial distance from the input element.

Still another object of the present invention lies in the provision of a control device featuring a chambered structure having communicating input and feedback nozzles and a pressure movable surface preferably of the ramp or cam type effective to produce a shaft position output and vary the flow area of the feedback nozzle to balance the system at some unique position for a given input.

Other objects and advantages will become more apparent during the course of the following description, particularly when taken in connection with the accompanying drawings.

In the drawings, wherein like numerals are employed to designate like parts throughout the same:

FIGURE 4 is a perspective view of a preferred form of control device as utilized in the arrangement of FIGURE 3;

FIGURE 5 is a view in section of one end of the preferred rotary control device;

FIGURE 6 is an end view of the control mechanism of FIGURE 3 showing the connection passages with the chambers therein;

FIGURE 7 is a graph plotting chamber pressure against flow for the control device of FIGURE 1; and FIGURE 8 is a graph plotting output against time for the control mechanism of FIGURE 1.

The control actuator power servo amplifier loop of this invention is effective to convert relatively small displacement signals of the order of a few thousandths of an inch at low power levels to substantially larger linear or rotary output signals in the nature of one inch or more at markedly higher power levels. A particularly useful application for the present control device lies in the furnishing of metered quantities of fuel to a gas turbine reaction engine in response to input motion from a throttle. An exemplary arrangement of this character is shown in FIGURE 1, although many other varied applications exist for the control component, especially when it is borne in mind that the input to the component may come from either a temperature, speed or pressure sensor.

Figure 1:
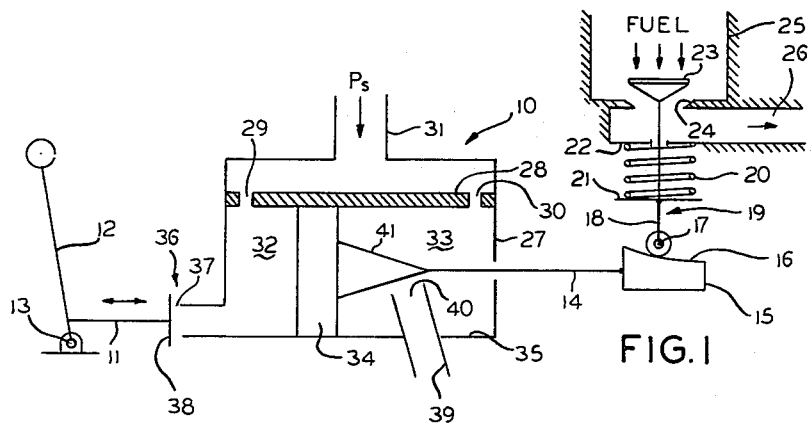
FIGURE 1 is a schematic view showing an exemplary application of the control actuator mechanism of this invention employed to position cam means opening a fuel line through a suitable follower and valve arrangement.

Referring now to the exemplary embodiment of FIGURE 1, a control component of the linear type is designated generally therein by the numeral 10 and is shown in association with an input shaft 11 connecting with a throttle or similar means 12 pivotally supported at 13 upon suitable structure, the action of the component 10 in amplifying the input signal being transmitted through an output shaft 14 attaching with a positioning cam 15 having a shaped bearing surface 16 receiving follower means 17 connecting with a stem portion 18 of a fuel valve 19. Spring means 20 bottoming at one end on a retainer collar 21 supported by the valve stem 18 and bottoming at its opposite end at 22 against fuel valve assembly structure resiliently urges head portion 23 of the valve axially toward a tapered opening 24 in the fuel flow inlet port 25. Opening of the valve 19 to the position shown by action of the follower 17 on the cam 15 provides a metered fuel flow to the engine through a passage designated at 26.

The linear type control component or mechanism 10 is provided with a housing 27 supporting therewithin a plate or baffle member 28 having a pair of fixed diameter orifices 29 and 30 receiving air at essentially constant pressure $P_s$ through a conduit 31, and passing the same into a pair of chambers 32 and 33 provided at opposite ends of piston means 34 linearly movable in contact with the baffle or plate member 28 and bottom wall 35 of the control component housing 27.

Communicating with the chamber 32 and thus with one face or end of the piston 34 is an input nozzle 36, which in the form shown comprises an annular conduit or inlet 37 integral with the housing 27 and a plate member or similar means 38 connected to the input shaft 11 and linearly movable in response to throttle movement to vary the effective flow area of the input nozzle 36. As an alternative, variations in the area of the variable orifice 37 of the nozzle 36 may be obtained by movement of a tapered probe concentric with the orifice which will vary the annular area created thereby.

Communicating with the opposite end or face of the piston 34, and accordingly with the chamber 33, is a feedback or exhaust nozzle 39 porting to the atmosphere and provided at its opposite end with a variable orifice 40. Varying the effective annular flow area of the orifice 40 of the feedback nozzle 39 is a shaped ramp 41 of generally conical configuration in the form shown, which is connected at its base to the piston 34 and at its apex with the output shaft 14 to be linearally movable with the piston means.

It is to be now noted that under conditions of operation when the respective annular areas of the orifices 37 and 40 of the nozzles 36 and 39 are equal, and the chambers 32 and 33 supplied with a constant pressure air flow through the conduit 31, pressures within the chambers 32 and 33 are equal to one another and the control actuator mechanism 10 and components associated therewith are in a condition of balance. However, when the input is disturbed and a consequent change in the annular area of the orifice 37 is effected, as by movement of the throttle 12 in the illustrative embodiment shown, the pressure within the chamber 32 differs from the pressure within the chamber 33 and movement of the piston 34 linearally will occur. Slidable linear movement of the piston 34 upon the plate or baffle member 28 and bottom wall 35 of the housing 27 continues until the shaped ramp 41 connected to the piston moves sufficiently to render the effective flow area of the feedback orifice 40 equal to the effective flow area of the input orifice 37, to thereby restore the pressures within the chambers 32 and 33 to a balanced or equalized condition, whereupon piston movement and output shaft movement are stopped. In order, however, for the annular orifice areas to be equal, the piston must move farther than the input, since the feedback orifice area is changed by a function of the ramp angle, rather than direct translation of the piston. In the illustrated example of FIGURE 1, output shaft movement of course causes travel of the positioning cam 15 and follower movement thereon to provide a metered fuel flow through the passage 26 by axial travel of the valve 19 to an open position.

In tabular form below there is set forth certain design data characterizing a typical control actuator mechanism 10, and from which a clear indication of the accuracy and effectiveness of the novel device may be obtained. While the input employed is a bi-metallic temperature sensor, this is only one means of obtaining input motion and a pressure element, or a speed element such as the throttle 12 of FIGURE 1, are equally effective.

| | |
|---|---|
| Input | 0–400° F. utilizing a bi-metallic temperature sensor giving a motion of 0.0064 inch. |
| Output | 1 inch desired. |
| Steady State Gain | 156. |
| Ramp Angle | 0.4°. |
| Piston | 1″ diameter $A_2 = 0.9A$. |
| Nozzles | 0.030″ diameter. |
| Fixed orifices | 0.468″ diameter. |
| Fluid | Hydraulic. specific weight, 50 #/ft.³ bulk modulus, 230,000 p.s.i. supply pressure, 500 p.s.i. drain pressure, 50 p.s.i. |
| Moving parts | ½# weight. |
| Chamber sizes | Chamber 1, 1″ D x ½″. Chamber 2, 1″ D x 1½″. |

Employing the design data appearing above, a plot of pressure in each chamber 32 and 33 in p.s.i.g. against flow in g.p.m. can be made as is shown in FIGURE 7. By linearizing about the midpoint $x$ or input equals 0.0032 at 500 p.s.i. supply, performance data is obtained showing that the natural frequency is 3.25 rad./sec. or 0.52 c.p.s., while the damping ratio is 1.3 and the effective spring constant 555 lbs./in. At the same midpoint and supply pressure noted, it has been found that a flow of about 0.036 g.p.m./chamber is required for a control component characterized by the design data above set forth, or a total of 0.072 g.p.m. The maximum flow required, occurring when input or $x$ is 0 has been found to be 0.124 g.p.m.

FIGURE 8 is a graph plotting output against time for a control device of the same design characteristics noted, and the plot is clearly indicative of the response of the controller to a full step input. The input represents a step of 400° F. from the temperature sensor or a motion of 0.0064 inch. The resultant output is 1.11 inches, or a substantial gain of 174. It is to be noted that the 63% point is reached in only about 0.8 second.

Figure 2:
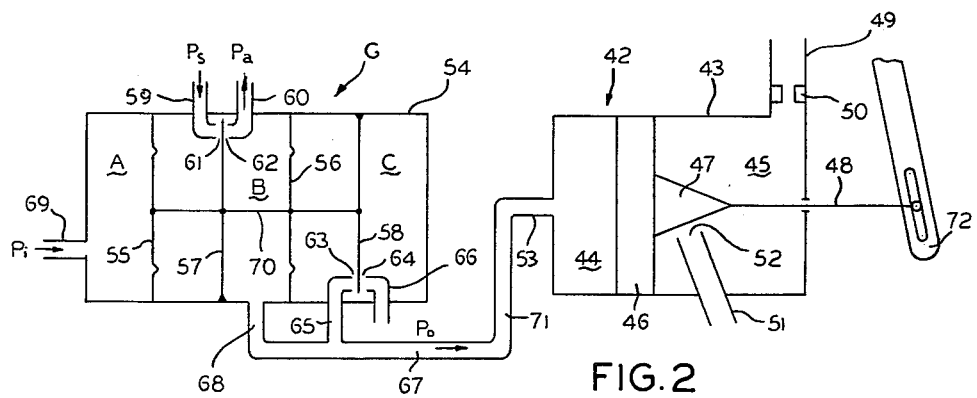
FIGURE 2 is a schematic view of another exemplary application of the present device receiving a pressure signal and producing a shaft position output.
Figure 3:
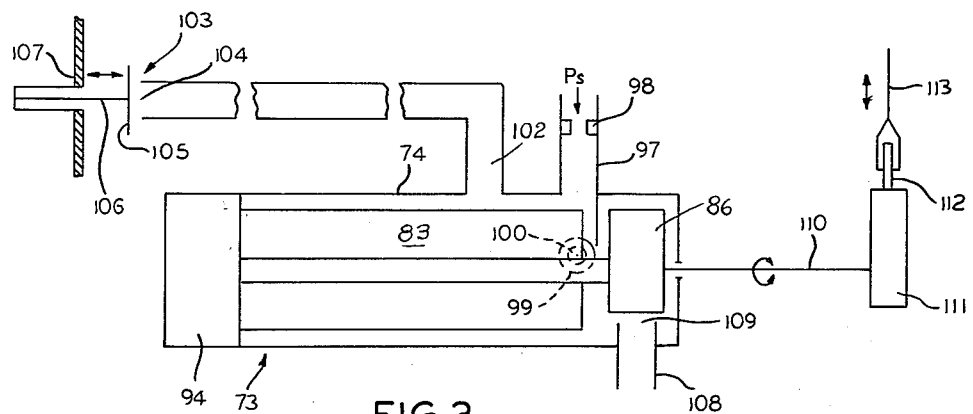
FIGURE 3 is a schematic view illustrating the use of a rotary type control actuator mechanism wherein the input nozzle flow area is varied by a temperature responsive signal and the rotary output signal produced used to position cam means acted upon by a follower and output arrangement.

Modifications can be effected in the structural features of the control device without substantial sacrifice in the outstanding performance characteristics noted in the preceding paragraph. A control actuator mechanism operating in the manner earlier described and utilizing signal pressure to effect a high power shaft output is shown in FIGURE 2, and reference is now made thereto. The control component is identified in FIGURE 2 by the numeral 42, and comprises a housing 43 the interior of which is divided into two chambers 44 and 45 by a linearly movable piston 46 supporting on one face a conically shaped ramp 47 connecting with an output shaft 48 extending outwardly of the housing 43. A supply of air is admitted to the chamber 45 at constant pressure $P_s$ through a conduit 49 provided with a fixed orifice 50.

A feedback nozzle 51 of the same character as in the preceding form of the invention is provided, and said nozzle is characterized at one end of an orifice 52 the annular area or flow area of which is varied by linear movement of the contoured ramp 47. A conduit 53 communicates with the chamber 44 through the housing 43 to admit or supply gas at a particular signal pressure $P_0$ from a suitable signal source.

While many signal pressure sources are suitable for the present purposes, a particularly effective construction has been found to be a pneumatic function generator G of the character shown in FIGURE 2. This device comprises a sealed casing 54 divided into chambers A, B and C by a pair of flexible diaphragms 55 and 56. Chambers B and C are each provided with valve closures, which as illustrated, take the form of flapper elements 57 and 58. These elements are oppositely disposed in spaced parallel relationship, and each comprises a relatively thin elongated plate of metal or some other resilient material. The elements 57 and 58 are connected to opposite walls of the casing 54, as by soldering or other convenient methods, and are capable of resiliently bending within predetermined limits.

A pair of conduits 59 and 60 extend into the casing, and conduit 59 is supplied with air at some constant pressure $P_s$ while conduit 60 communicates with the ambient air to provide an exhaust for the casing at some pressure $P_a$. The portions of the conduits inside the casing are shaped to project toward one another. The portions terminate in orifices 61 and 62 which are oppositely disposed in closely spaced facing relation. The position of flapper element 57 between the orifices 61 and 62 regulates the air flow in and out of the casing 54. In a like manner, flapper element 58 cooperates with orifices 63 and 64 on the similarly positioned inlet and outlet conduits 65 and 66. As is shown, conduit 65 is the feedback from the outlet conduit 67 which extends from a port 68 in a sidewall of chamber B. Input or control air at a pressure $P_i$ enters chamber A of the function generator G through a conduit 69. A control rod 70 rigidly connects diaphragms 55 and 56 with both of the flapper elements 57 and 58, bending them and requiring them to move in unison. The spacing between the orifices, the effective areas of the diaphragms, and the inlet pressure $P_s$ may be adjusted so that the output pressure $P_0$ and the control pressure $P_i$ may have any desired functional relationship.

During a condition of balance within the system or apparatus shown in FIGURE 2, pressures within the chambers 44 and 45 of the control actuator mechanism 42 are equal. However, when a pressure signal from a source such as generator G or other device is sent through the connections or conduits 67, 71 and 53 to the chamber 44, the pressure balance condition is interrupted and linear travel of the piston 46 and output shaft 48 occurs to perform useful work upon another computing device 72, which may be a multiplier connecting with the output shaft. During piston movement the ramp 47 is varying the annular flow area of the orifice 52 of the feedback nozzle 51, and this variation action continues until the respective pressures of the chambers 44 and 45 are equal, and upon reaching a balanced condition of the chambers piston movement no longer occurs. As noted, other input pressure sources may be employed with considerable effectiveness, and the recipient of shaft output can similarly be devices of other than the computing type.

It is to be further appreciated that substantial variations may be undertaken in the arrangements of FIGURES 1 and 2, as well as in the rotary type controller component now to be described. In addition to utilizing input elements in the form of either temperature, speed and pressure sensors, the control actuator mechanism of this invention may be located a substantial distance from the input element by employing a relatively long line or connection between the input nozzle and the control component housing. Further, while the ramps 41 of FIGURE 1 and 47 of FIGURE 2 in the exemplary forms shown are shaped or cut linearly, as will also be the case with the cam means of the rotary type controller later described, the ramps and cams may be machined to provide a much different output. For example, if the output desired is some function of the input, other than linear, as the square root thereof, particular machining of the ramp or cam is accomplished to give this output.

Regards to the apparatus of FIGURE 2, the control component 42 shown therein may be effectively employed as a pressure to motion transducer, thereby replacing springs in high temperature applications. For this purpose, input supply and exhaust nozzles are omitted and the pressure of interest in brought into the chamber 44. The change in input pressure causes a pressure unbalance across the piston, and the control component moves to equalize this pressure difference. The final position of the component structure will then be a function of the magnitude of the input pressure. To accomplish this result, however, it is imperative that a regulated pressure be supplied to the chamber 45.

In particular applications there are requirements to convert relatively small linear displacements into large rotary output signals at substantially higher power levels, and a structural embodiment of the present invention effective to produce rotary output signals is shown in FIGURES 3 to 6, to which reference is now made. A rotary type control actuator mechanism is designated generally therein by the numeral 73 and comprises a substantially cylindrical casing or housing 74 supporting therewithin a control member designated in its entirety by the numeral 75. The control member is machined or otherwise formed to include a pair of connecting generally pie-shaped quadrants 76 and 77 each having radially extending walls 78 and 79 perpendicularly disposed relative to one another and connected by a rounded outer wall 80. The apex of each of the quadrants 76 and 77 is formed to provide bearing surfaces 81 receiving a longitudinally extending centrally located beaded portion 82 on an impeller member 83, said impeller member being thereby mounted for rotation in clockwise and counter-clockwise directions under pressure fluctuations to move blade portions 84 and 85 formed thereon toward and away from the walls or surfaces 78 and 79 on each of the quadrants 76 and 77. One end of the blade portion of the impeller member 83 carries thereon a generally pie-shaped cam member 86 performing generally the same function as the ramps 41 and 47 of the linear type controllers shown in FIGURES 1 and 2. A limit or stop on the extent of rotative movement of the cam 86 and associated impeller 83 is provided by a wedge portion 87 preferably formed integrally with one end of the quadrant 77. It may now be seen that the impeller rotates through an arc of 90 degrees, although it is within the contemplation of this invention that the control member 75 may be suitably varied to provide for various degrees of rotation, ranging from 0 to 360 degrees.

When mounted in the housing 74 in the manner earlier described, the control member 75 is characterized by four chambers 88a, 88b, 89a and 89b defined by the blade portion 85 of the impeller 83 and the walls 78 and 79 of the quadrant 77 and the blade portion 84 and corresponding surfaces 78 and 79 of the quadrant 76. It may thus be seen that the chambers 88a and 88b are diametrally opposed to one another, and that the chambers 89a and 89b are similarly located with respect to one another. To establish communication between a pressurized gas source or supply and the chambers noted, one end of the quadrant 76 is passaged with a pair of openings 90 and 91 formed in a generally right angle manner as shown in FIGURE 4, while the opposite end of both quadrants 76 and 77 are provided with similarly shaped passages 92 and 93 connected by means of a plate or block 94 of essentially the construction shown in FIGURE 6. The interconnection block 94 is preferably of disc shape and is suitably secured to one end of the component housing 74. The block is of sufficient thickness to permit the formation therein of a pair of diagonally extending, non-intersecting passages 95 and 96, the passage 95 connecting the chambers 89a and 89b and the passage 96 connecting the chambers 88a and 88b. While not shown, the end of the quadrants 76 and 77 carrying the passages 92 and 93 is of course provided with an additional pair of openings in the other corner of each of said quadrants 76 and 77.

The inlet passage 90 in the quadrant 76 connecting with chambers 88a and 88b communicates with a conduit 97 (FIGURE 3) having a fixed orifice 98 and supported by the component housing 74. The inlet passage 91, on the other hand, which communicates with the chambers 89a and 89b, receives air at a constant pressure $P_s$ through a conduit 99 also having a fixed orifice 100 therein and supported by the housing or casing 74.

As appears in FIGURE 4, the quadrant 76 is shaped at one end with an extended roof or shelf portion 101 providing a supporting surface for a conduit 102 passing through the housing wall and terminating at its opposite end in an input nozzle 103. The nozzle 103 is of essentially the same construction as the nozzle 36 of FIGURE 1, and is provided with an orifice 104 the annular flow area of which is varied by a plate member or other suitable means 105 connecting with an input shaft 106 linearly movable under the action of a temperature probe 107, speed means such a throttle as shown in FIGURE 1, or a suitable pressure sensor, as the particular application may dictate.

The housing or casing 74 further supports a cam nozzle 108 having an annular orifice 109 variable in area by rotation of the feedback cam 86 in generally the manner of the orifices 40 and 52 by action of the ramps 41 and 47 of FIGURES 1 and 2. Connecting with the feedback cam 86 and extending through one end of the housing 74 is a rotatable output shaft 110 supporting at its opposite end a suitably shaped positioning cam 111 upon which travels a follower or other suitable means 112 carrying a shaft or similar device 113. The device 113 could of course be a valve such as at 19 in FIGURE 1, or other means receiving the benefit of the conversion of a small linear displacement into a large rotary output signal at higher power levels.

The rotary control component 73 of FIGURES 3 to 6 operates upon the same principles as the linear or translatory components of FIGURES 1 and 2. To explain, when an input signal is transmitted by means such as the temperature probe 107, movement of the input shaft 105 occurs, thereby moving the plate member 106 and changing the effective flow area of the input nozzle 103, which is in fluid communication with the chamber 88a through the conduit 102. Pressures within the chambers 88a and 88b are varied, said chambers being interconnected by means of the block or plate 94 and associated openings 90—93 in the quadrants 76 and 77. The difference between the pressure within the chambers 88a and 88b and the pressure in the chambers 89a and 89b causes the impeller member 83 and feedback cam 86 associated therewith to rotate. During rotation, the cam 86 changes the effective flow area of the cam nozzle 108, thereby altering or varying the pressure in the chambers 89a and 89b. When sufficient rotation of the impeller 83 and cam 86 has occurred to produce equal effective flow areas of the input nozzle 103 and cam nozzle 108, there is no pressure differential between the chambers 88a—88b and chambers 89a—89b, and accordingly, rotation of the impeller 83 and feedback cam 86 is stopped. It is of course appreciated that during rotation of the feedback cam 86, rotary motion of the output shaft 110 occurs and useful work is performed through the elements 111, 112 and 113.

As noted earlier in connection with the ramp construction of FIGURES 1 and 2, variations can readily be practiced in the shape or contour of either the ramp or cam herein disclosed. The shape need not be linear, since if the output desired is some function of the input other than linear, as for example the square root, the ram or cam can be machined to give this output. Further, variations in the impeller configuration can be effected to produce rotation ranging from 0 to 360 degrees. The control component constructed in accordance with the principles of this invention also finds considerable utility as a function generator. Thus, any single valued function can be generated by contouring the feedback cam or ramp to the shape of the function. As for example, if the ramp or feedback cam is contoured to the shape of total pressure divided by static pressure against Mach number calibration curve, an input motion to the component which is a function of the pressure ratio noted will result in an output motion which is a linear function of Mach number. The output is at a markedly high power level and performs useful work.

As was noted in connection with FIGURE 2, the control actuator mechanism can also readily be used as a pressure to motion transducer, thereby replacing springs in high temeprature applications. While the mechanism of this invention finds particular utility in aircraft control systems, it is to be appreciated that many and varied uses will be found in addition to those stated. The present invention accurately converts small displacement signals of the order of a few thousandths of an inch at low power levels to larger displacement or rotary output signals in the nature of one inch at substantially high power levels. Displacement gains between one and two hundred are produced without employing the complex linkages characterizing the prior art structures, and thereby linkage length changes due to temperature, wearing of the linkages and the friction induced thereby are eliminated. Further, the output position or system gain is independent of unregulated power supplies such as the compressor discharge pressure from a gas turbine engine.

Variations and modifications may be effected without departing from the scope of the novel concepts of this invention.

I claim as my invention:

1. A control component comprising, a housing and at least one supply passage therein communicating with the interior of the housing and directing thereto a fluid at constant pressure, a piston slidable within the housing and dividing the same into at least two chambers of equal pressures when the piston is at rest, said housing supply passage supplying gas to both of said chambers at regulated pressure, an input nozzle communicating with said supplying passage and connected to one of the chambers and provided with a variable annular area orifice, an input signal source and means connecting therewith varying the annular area of the orifice in response to an input signal and thereby unbalancing the pressures in the chambers and causing piston movement, a feedback nozzle disposed generally obliquely to the horizontal axis of the housing connecting with another of the chambers therein and having a variable annular area orifice, and a generally conically contoured ramp carried along its base by the piston and located for linear travel with the piston toward and away from the feed-back nozzle and during said travel varying the annular area of the nozzle orifice and balancing the pressures in the chambers, whereupon piston movement is stopped, a reduction in the flow area of the input nozzle causing a pressure increase in said one chamber and moving the ramp toward the feedback nozzle until the flow areas of the input and feedback nozzles are substantially the same.

2. A control component comprising, a housing and at least one supply passage therein communicating with the interior of the housing and directing thereto a fluid at constant pressure, a piston slidable within the housing and dividing the same into at least two chambers of equal pressures when the piston is at rest, said housing supply passage supplying gas to both of said chambers at regulated pressure, an input nozzle communicating with said supplying passage and connected to one of the chambers and provided with a variable annular area orifice, an input signal source, means connecting the input signal source to the input nozzle to unbalance the pressures in the chambers and cause piston movement in response to an input signal, a feedback nozzle disposed generally obliquely to the horizontal axis of the housing connecting with another of the chambers therein and having a variable annular area orifice, and a generally conically contoured ramp carried along its base by the piston and located for linear travel with the piston toward and away from the feedback nozzle and during said travel varying the annular area of the nozzle orifice and balancing the pressures in the chambers, whereupon piston movement is stopped, a reduction in the flow area of the input nozzle causing a pressure increase in said one chamber and moving the ramp toward the feedback nozzle until the flow areas of the input and feedback nozzles are substantially the same.

3. A control component comprising a housing, at least one constant pressure fluid supply passage defined by said housing, a piston dividing the housing interior into at least two chambers and being slidable therein, an input passage nozzle defining an orifice connected with one chamber, a feedback nozzle disposed generally obliquely to the horizontal axis of the housing connected with another chamber and defining an orifice therein, means supplying constant pressure fluid to said housing supply passage and to said one and said other chambers to provide said chambers with equal pressures when said movable member is at rest, an input signal source, means connecting the input signal source with the input nozzle varying the input nozzle orifice in response to an input signal and thereby unbalancing the pressures in the chambers and causing piston movement, and a generally conically contoured ramp shaped as a function of the input signal carried by the piston and located for linear travel with the piston toward and away from the feedback nozzle and during said travel varying the annular area of the feedback nozzle orifice and balancing the pressures in the chambers whereupon piston movement is stopped.

4. A control component comprising a housing, at least one constant pressure fluid supply passage defined by said housing, a piston dividing the housing interior into at least two chambers and being slidable therein, an input passage nozzle defining an orifice connected with one chamber, a feedback nozzle disposed generally obliquely to the horizontal axis of the housing connected with another chamber and defining an orifice therein, means supplying constant pressure fluid to said housing supply passage and to said one and said other chambers to provide said chambers with equal pressures when said movable member is at rest, an input signal source, means connecting the input signal source to the input nozzle to unbalance the pressures in the chambers and cause piston movement in response to an input signal, a generally conically contoured ramp shaped as a function of the input signal carried by the piston and located for linear travel with the piston toward and away from the feedback nozzle and during said travel varying the annular area of the feedback nozzle orifice and balancing the pressures in the chambers whereupon piston movement is stopped.

5. A control component comprising a housing, at least one constant pressure fluid supply passage defined by said housing, a piston dividing the housing interior into at least two chambers and being slidable therein, an input passage nozzle defining an orifice connected with one chamber, a feedback nozzle disposed generally obliquely to the horizontal axis of the housing connected with another chamber and defining an orifice therein, means supplying constant pressure fluid to said housing supply passage and to said one and said other chambers to provide said chambers with equal pressures when said movable member is at rest, an input signal source, means connecting the input signal source with the input nozzle varying the input nozzle orifice in response to an input signal and thereby unbalancing the pressures in the chambers and causing piston movement, and a generally conically contoured ramp shaped as a function of the input signal carried by the piston and located for linear travel with the piston toward and away from the feedback nozzle and during said travel varying the annular area of the feedback nozzle orifice and balancing the pressures in the chambers whereupon piston movement is stopped, and an output shaft connected to said ramp and displaceable at a gain of at least 100 relative to the magnitude of the input signal.

6. A control component comprising a housing, at least one constant pressure fluid supply passage defined by said housing, a plate member in said housing having orifices communicating with the supply passage, a movable member slidable within the housing in contact with the plate member and dividing the housing into at least two chambers each of which connects with the supply passage through the plate member orifices, an input passage nozzle defining an orifice connected with one chamber, a feedback nozzle disposed generally obliquely to the horizontal axis of the housing connected with another chamber and defining an orifice therein, means supplying constant pressure fluid to said housing supply passage and to said one and said other chambers to provide said chambers with equal pressures when said movable member is at rest, an input signal source, means connecting the input signal source with the input nozzle varying the input nozzle orifice in response to an input signal and thereby unbalancing the pressures in the chambers and causing piston movement, and a generally conically contoured ramp shaped as a function of the input signal carried by the piston and located for linear travel with the piston toward and away from the feedback nozzle and during said travel varying the annular area of the feedback nozzle orifice and balancing the pressures in the chambers whereupon piston movement is stopped.

References Cited in the file of this patent

UNITED STATES PATENTS

| | | |
|---|---|---|
| 2,094,867 | Baker | Oct. 5, 1937 |
| 2,396,951 | Horstmann | Mar. 19, 1946 |
| 2,477,897 | Ray | Aug. 2, 1949 |
| 2,564,108 | Holley | Aug. 14, 1951 |
| 2,767,725 | Long | Oct. 23, 1956 |
| 2,914,076 | Zimmerli | Nov. 24, 1959 |
| 2,939,472 | Eller | June 7, 1960 |
| 2,965,118 | Lindbom | Dec. 20, 1960 |
| 2,966,141 | Corbett | Dec. 27, 1960 |
| 2,969,640 | Reed | Jan. 31, 1961 |

FOREIGN PATENTS

| | | |
|---|---|---|
| 278,689 | Germany | Oct. 2, 1914 |
| 899,287 | Germany | Oct. 29, 1953 |
| 736,003 | Great Britain | Aug. 31, 1955 |